United States Patent
Schiffer et al.

(10) Patent No.: US 9,527,036 B2
(45) Date of Patent: Dec. 27, 2016

(54) CATALYST SYSTEM FOR TREATING NO$_x$- AND PARTICLE-CONTAINING DIESEL EXHAUST GAS

(71) Applicant: UMICORE AG & CO. KG, Hanau-Wolfgang (DE)

(72) Inventors: Michael Schiffer, Hanau (DE); Ulrich Goebel, Hattersheim (DE); Franz Dornhaus, Rodgau (DE); Anke Schuler, Woerth (DE); Ruediger Hoyer, Alzenau-Hoerstein (DE); Marcus Pfeifer, Solingen (DE); Gerald Jeske, Neuberg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/442,022

(22) PCT Filed: Nov. 8, 2013

(86) PCT No.: PCT/EP2013/003374
§ 371 (c)(1),
(2) Date: May 11, 2015

(87) PCT Pub. No.: WO2014/072067
PCT Pub. Date: May 15, 2014

(65) Prior Publication Data
US 2015/0273394 A1 Oct. 1, 2015

(30) Foreign Application Priority Data
Nov. 12, 2012 (EP) ..................... 12192178

(51) Int. Cl.
| | | |
|---|---|---|
| *B01D 53/34* | (2006.01) |
| *B01D 53/56* | (2006.01) |
| *B01D 53/94* | (2006.01) |
| *B01D 50/00* | (2006.01) |
| *B01J 8/02* | (2006.01) |
| *F01N 3/10* | (2006.01) |
| *B01J 21/00* | (2006.01) |
| *B01J 21/04* | (2006.01) |
| *B01J 21/16* | (2006.01) |
| *B01J 29/00* | (2006.01) |
| *B01J 23/02* | (2006.01) |
| *B01J 23/08* | (2006.01) |
| *B01J 23/10* | (2006.01) |

(Continued)

(52) U.S. Cl.
CPC ....... *B01D 53/9477* (2013.01); *B01D 53/9431* (2013.01); *B01J 21/04* (2013.01); *B01J 23/42* (2013.01); *B01J 23/44* (2013.01); *B01J 23/464* (2013.01); *B01J 29/126* (2013.01); *B01J 29/22* (2013.01); *B01J 29/44* (2013.01); *B01J 29/7415* (2013.01); *B01J 35/0006* (2013.01); *B01J 35/04* (2013.01); *B01J 37/0246* (2013.01); *B01J 37/0248* (2013.01); *F01N 3/035* (2013.01); *F01N 3/0814* (2013.01); *F01N 3/2066* (2013.01); *B01D 2255/1021* (2013.01); *B01D 2255/1023* (2013.01); *B01D 2255/1025* (2013.01); *B01D 2255/2063* (2013.01); *B01D 2255/2092* (2013.01); *B01D 2255/402* (2013.01); *B01D 2255/502* (2013.01); *B01D 2255/91* (2013.01); *Y02T 10/24* (2013.01)

(58) Field of Classification Search
CPC B01D 53/9477; B01D 53/9431; B01J 29/068; B01J 29/7415; B01J 35/04; B01J 35/10; B01J 21/02; B01J 21/04; B01J 21/22; B01J 23/40; B01J 23/42; B01J 23/44; B01J 23/46; B01J 23/58; B01J 23/63; B01J 23/6482; B01J 23/78
USPC 422/169, 171, 177, 180; 423/213.2; 502/73, 502/74, 80, 302–304, 327, 328, 332–334, 502/339, 355, 439; 60/299
See application file for complete search history.

(56) References Cited

U.S. PATENT DOCUMENTS

| | | |
|---|---|---|
| 6,471,924 B1 | 10/2002 | Feeley |
| 7,063,642 B1 | 6/2006 | Hu et al. |

(Continued)

FOREIGN PATENT DOCUMENTS

| | | |
|---|---|---|
| EP | 0 758 713 | 2/1997 |
| EP | 1837076 A1 | 9/2007 |

(Continued)

OTHER PUBLICATIONS

SAE Technical Paper Series 2005-01-1756; M. Pfeifer, M. Votsmeier, M. Kogel, P.C. Spurk, E.S. Lox, J.F. Knoth; The Second Generation of Catalyzed Diesel Particulate Filter Systems for Passenger Cars—Particulate Filters with Integrated Oxidation Catalyst Function; Apr. 11, 2005 (pp. 120-130).

(Continued)

*Primary Examiner* — Cam N. Nguyen
(74) *Attorney, Agent, or Firm* — Smith, Gambrell & Russell, LLP

(57) ABSTRACT

The present invention relates to a catalyst system for treatment of diesel exhaust gas, comprising, in flow direction of the exhaust gas,
a nitrogen oxide storage catalyst containing a nitrogen oxide storage component and noble metal and
a diesel particulate filter containing noble metal selected from the group of platinum, palladium, and platinum and palladium,
characterized in that the noble metal loading of the nitrogen oxide storage catalyst is 100 to 180 g/ft$^3$ (3.53 to 6.36 g/L) and the noble metal loading of the diesel particulate filter is 5 to 35 g/ft$^3$ (0.18 to 1.24 g/L).

14 Claims, No Drawings

(51) Int. Cl.
*B01J 23/40* (2006.01)
*B01J 23/42* (2006.01)
*B01J 23/44* (2006.01)
*B01J 23/56* (2006.01)
*B01J 23/58* (2006.01)
*F01N 3/035* (2006.01)
*F01N 3/08* (2006.01)
*F01N 3/20* (2006.01)
*B01J 37/02* (2006.01)
*B01J 35/00* (2006.01)
*B01J 23/46* (2006.01)
*B01J 29/12* (2006.01)
*B01J 29/22* (2006.01)
*B01J 29/44* (2006.01)
*B01J 29/74* (2006.01)
*B01J 35/04* (2006.01)

(56) References Cited

U.S. PATENT DOCUMENTS

| | | | | |
|---|---|---|---|---|
| 8,006,652 | B2* | 8/2011 | Guinther | B01D 53/94 123/1 A |
| 8,226,896 | B2* | 7/2012 | Pfeifer | B01D 53/9468 422/171 |
| 8,709,365 | B2 | 4/2014 | Dornhaus et al. | |
| 8,904,760 | B2* | 12/2014 | Mital | F01N 3/021 60/274 |
| 2006/0248874 | A1 | 11/2006 | Goersmann | |
| 2007/0077190 | A1 | 4/2007 | Ohno | |
| 2007/0089403 | A1* | 4/2007 | Pfeifer | B01D 53/9418 60/286 |
| 2007/0144143 | A1* | 6/2007 | Kaneeda | F01N 3/035 60/277 |
| 2008/0127638 | A1 | 6/2008 | Vaarkamp | |
| 2009/0173063 | A1 | 7/2009 | Boorse et al. | |
| 2010/0236224 | A1 | 9/2010 | Kumar | |
| 2011/0014099 | A1 | 1/2011 | Dornhaus | |
| 2012/0011832 | A1 | 1/2012 | Chigapov | |
| 2012/0214663 | A1 | 8/2012 | Chigapov | |

FOREIGN PATENT DOCUMENTS

| | | |
|---|---|---|
| EP | 1847319 A1 | 10/2007 |
| EP | 2275194 A1 | 1/2011 |
| EP | 2 094 951 | 4/2012 |
| EP | 2481473 A2 | 8/2012 |
| GB | 2 481 057 | 6/2010 |
| WO | 01/12320 | 2/2001 |
| WO | 2008/070551 A2 | 6/2008 |
| WO | WO2012/079598 | 6/2012 |

OTHER PUBLICATIONS

SAE Technical Paper Series 950809; N. Miyoshi, S. Matsumoto, K. Katoh, T. Tanaka, J. Harada, N. Takahashi, K. Yokota, M. Sugiura, K. Kasahara; Development of New Concept Three-Way Catalyst for Automotive Lean-Burn Engines, Feb. 1, 1995 (15 pages).

International Search Report for PCT/EP2013/003374, dated Mar. 27, 2014 in English and German (6 pages).

Written Opinion of the International Searching Authority for PCT/EP2013/003374, dated Mar. 27, 2014 in English and German (11 pages).

\* cited by examiner

CATALYST SYSTEM FOR TREATING NO$_x$- AND PARTICLE-CONTAINING DIESEL EXHAUST GAS The present invention relates to a catalyst system for treatment of diesel exhaust gas, which comprises, in flow direction of the exhaust gas, a nitrogen oxide storage catalyst and a diesel particulate filter, wherein the two constituents include catalytically active noble metals.

The exhaust gas of motor vehicles driven by diesel engines contains not only carbon monoxide (CO) and nitrogen oxides (NO$_x$) but also constituents which originate from the incomplete combustion of the fuel in the combustion chamber of the cylinder. These include not only residual hydrocarbons (HCs), which are usually likewise predominantly in gaseous form, but also particulate emissions, also referred to as "diesel soot" or "soot particles". These are complex agglomerates composed of predominantly carbon-containing solid particles and an adhering liquid phase usually consisting mainly of relatively long-chain hydrocarbon condensates. The liquid phase adhering on the solid constituents is also referred to as "soluble organic fraction SOF" or "volatile organic fraction VOF".

To clean these exhaust gases, said constituents have to be converted very substantially to harmless compounds, which is possible only using suitable catalysts.

For instance, carbon monoxide (CO), gaseous hydrocarbons (HCs) and any organic agglomerates adhering to the soot particles (known as "volatile organic fraction", VOF) can be removed oxidatvely with the aid of oxidation catalysts.

Particulate emissions are removed from the exhaust gas of diesel vehicles by using particulate filters. Particulate filters are generally wall flow filter substrates, i.e. honeycombs having alternate inflow and outflow channels which are sealed gas-tight, bounded by porous walls and divided from one another. The particulate-containing exhaust gas flowing into the inflow channels is forced by a gas-tight closure plug present on the exit side to pass through the porous wall, and exits from the wall flow filter substrate again from the outflow channels closed on the inflow side. In the course of this, diesel soot is filtered out of the exhaust gas.

As the amount of filtered soot particles increases, the backpressure in the exhaust gas system rises, and so the filter has to be regenerated at regular intervals by burning off the soot. Since the temperatures of more than 550° C. that are required for ignition and burnoff of the soot with oxygen can typically be achieved only in full-load operation in modern passenger vehicle diesel engines, additional measures are absolutely necessary for oxidation of the filtered soot particles, in order to prevent blockage of the filter by soot. For this purpose, the filter can be coated with a catalyst layer capable of lowering the soot ignition temperature. Particulate filters provided with a catalyst layer are also referred to as cDPFs (catalyzed diesel particulate filters) and are described, for example, in SAE document SAE 2005-01-1756.

One possible way of removing nitrogen oxides is to use nitrogen oxide storage catalysts, for which the term "lean NOx trap" or LNT has become established. The cleaning effect thereof is based on storage of the nitrogen oxides by the storage material of the storage catalyst, predominantly in the form of nitrates, in a lean operating phase of the engine, and breakdown thereof again in a subsequent rich operating phase of the engine, and reaction of the nitrogen oxides thus released with the reducing exhaust gas constituents over the storage catalyst to give nitrogen, carbon dioxide and water. This mode of operation is described, for example, in the SAE document SAE 950809.

Useful storage materials especially include oxides, carbonates or hydroxides of magnesium, calcium, strontium, barium, the alkali metals, the rare earth metals or mixtures thereof. Because of their basic properties, these compounds are capable of forming nitrates with the acidic nitrogen oxides in the exhaust gas and of storing them in this way. They are deposited on suitable support materials in very high dispersion to create a large interaction area with the exhaust gas. Nitrogen oxide storage catalysts generally additionally contain noble metals such as platinum, palladium and/or rhodium as catalytically active components. They have the task firstly of oxidizing NO to $NO_2$, and CO and HC to $CO_2$ under lean conditions, and secondly of reducing $NO_2$ which is released during the rich operating phases in which the nitrogen oxide storage catalyst is regenerated to nitrogen.

A further known process for removing nitrogen oxides from exhaust gases in the presence of oxygen is the selective catalytic reduction process (SCR process) by means of ammonia over a suitable catalyst, the SCR catalyst. In this process, the nitrogen oxides to be removed from the exhaust gas are reacted with ammonia to give nitrogen and water. The ammonia used as reducing agent can be produced as a secondary emission in the exhaust gas system, or it is made available by metered introduction of a precursor compound from which ammonia can be formed, for example urea, ammonium carbamate or ammonium formate, into the exhaust gas line and subsequent hydrolysis.

Performance of the latter variant of the SCR process requires a source for provision of the reducing agent, an injection device for metered introduction of the reducing agent into the exhaust gas as required, and an SCR catalyst disposed in the flow path of the exhaust gas.

In order that the harmful exhaust gas components in question can be removed to the required degree, said catalysts and filters have to be combined with one another in a suitable manner to form an exhaust gas treatment system. This is especially true of vehicles that are to meet the Euro 6 standard or even successor standards.

For instance, US 2006/248874 describes a system comprising, in flow direction of the exhaust gas, a nitrogen oxide storage catalyst, a particulate filter and another nitrogen oxide storage catalyst. The first nitrogen oxide storage catalyst is designed so as to store nitrogen oxide at relatively low temperatures and to release it again at temperatures over and above 300° C., even under lean conditions. In the latter case, the nitrogen oxide can be utilized for oxidation of particulates on the downstream particulate filter. If the nitrogen oxide, however, is released under rich conditions, it can be reduced to $N_2$ by means of reduction catalysts, for instance rhodium. The second nitrogen oxide storage catalyst is designed so as to store nitrogen oxide under lean conditions at temperatures of 300° C. to 550° C. A disadvantage of this system is the requirement for space associated with the use of two nitrogen oxide catalysts, which is not available in many cases. Incidentally, the use of two nitrogen oxide storage catalysts is not optimal for economic reasons either.

US 2010/236224 describes a system which may comprise, in flow direction of the exhaust gas, a nitrogen oxide storage catalyst and a particulate filter. The system is especially characterized in that it has, on the outflow side toward the nitrogen oxide storage catalyst, an apparatus for metered introduction of air into the exhaust gas stream for reduction of hydrocarbons.

There is therefore a need for a system which effectively removes said pollutants, for which the space available is sufficient, and which can be manufactured in an economically viable manner.

It has now been found that a system composed of a nitrogen oxide storage catalyst and a diesel particulate filter disposed at the outflow end thereof fulfills these conditions and, more particularly, removes the CO and $NO_x$ emissions very effectively from the exhaust gas when catalytically active noble metal is distributed in an optimal manner over both constituents.

The present invention relates to a catalyst system for treatment of diesel exhaust gas, comprising, in flow direction of the exhaust gas,
  a nitrogen oxide storage catalyst containing a nitrogen oxide storage component and noble metal and
  a diesel particulate filter containing noble metal selected from the group of platinum, palladium, and platinum and palladium,
characterized in that the noble metal loading of the nitrogen oxide storage catalyst is 100 to 180 g/ft$^3$ (3.53 to 6.36 g/L) and the noble metal loading of the diesel particulate filter is 5 to 35 g/ft$^3$ (0.18 to 1.24 g/L).

Thus, the noble metal loading of the nitrogen oxide storage catalyst is higher than the noble metal loading of the diesel particulate filter.

The units g/ft$^3$ and g/L each denote the amount of the respective component in g per unit volume of the carrier substrate in ft$^3$ and L respectively.

Nitrogen oxide storage components which can be used in the nitrogen oxide storage catalysts are, for example, oxides, hydroxides, oxide hydroxides, carbonates and hydrogencarbonates of the alkali metals, the alkaline earth metals, lanthanum and the lanthanoids (Ce to Lu). Preference is given to oxides, hydroxides, oxide hydroxides, carbonates and hydrogencarbonates of sodium, potassium, strontium, barium and lanthanum. Particular preference is given to the use of oxides, hydroxides, oxide hydroxides and carbonates of strontium and of barium, and mixtures thereof.

In embodiments of the present invention, nitrogen oxide storage components used are oxides, hydroxides, oxide hydroxides, carbonates and/or hydrogencarbonates of the alkali metals or the alkaline earth metals in amounts of 15 to 20 g/L, based on the respective oxide. In other embodiments, additional components, for example cerium oxide, are used. In these cases, the amount of nitrogen oxide storage components is 150 to 250 g/L, based on the respective oxides.

Useful noble metals for the nitrogen oxide storage catalyst include, for example, platinum, palladium and/or rhodium. It is especially possible to use platinum or palladium as the sole noble metal or else to use them in a mixture with one another. If platinum and palladium are used, the Pt:Pd weight ratio is especially 2:1 to 10:1.

In embodiments of the present invention, the noble metal loading of the nitrogen oxide storage catalyst is 150 to 180 g/ft$^3$ (5.30 to 6.36 g/L).

Nitrogen oxide storage component and noble metal are typically present on suitable support materials. Support materials used are especially high-surface area, high-melting oxides, for example aluminum oxide, silicon dioxide, titanium dioxide, but also cerium-zirconium mixed oxides and magnesium-aluminum mixed oxides. In the context of the present invention, nitrogen oxide storage component and noble metal may be present together on one support material or else on different support materials.

In embodiments of the present invention, the nitrogen oxide storage catalyst is present as a ceramic or metallic flow-through substrate as a support body, to which the catalytically active constituents have been applied in the form of a coating. Suitable flow-through substrates are known and are available on the market.

The total washcoat loading of the nitrogen oxide storage catalyst, in embodiments of the present invention, is 250 to 400 g/L.

The diesel particulate filter contains, as noble metal, platinum, palladium, or platinum and palladium. In one embodiment of the present invention, it contains only platinum or only palladium.

In another embodiment of the present invention, it contains platinum and palladium with a Pt:Pd weight ratio of 1:2 to 12:1, for example 1:1, 6:1, 10:1 and 12:1.

In a further embodiment of the present invention, the noble metal loading of the diesel particulate filter is 10 to 25 g/ft$^3$ (0.35 to 0.88 g/L).

In a further embodiment of the present invention, the diesel particulate filter contains a zeolite compound, especially in an amount of 5 to 25 g/L, especially 10 to 20 g/L. Suitable zeolite compounds are thermally stable, large- or medium-pore zeolite structure types, especially β-zeolite, zeolite Y, mordenite and ZSM-5.

In a further embodiment of the present invention, the diesel particulate filter contains components which result in an $H_2S$ barrier function. Suitable components are known to those skilled in the art and are described in the literature. For example, EP 2 275 194 A1 describes an $H_2S$ barrier function which is achieved by means of a coating containing a copper compound, for example copper oxide, and a refractory support material, for example an γ-aluminum oxide.

In the diesel particulate filter too, the catalytically active constituents, i.e., especially noble metal and any zeolite compound, are present on a support material. Useful materials for this purpose are those already mentioned above in connection with the nitrogen oxide storage catalyst.

In embodiments of the present invention, the diesel particulate filter takes the form of a ceramic or metallic wall flow filter substrate as support body, to which the catalytically active constituents have been applied in the form of one or more coatings. In particular embodiments, the catalytically active constituents are present in the porous walls between the inflow and outflow channels. Suitable wall flow filter substrates are known and available on the market.

In one embodiment of the present invention, the catalytically active constituents are in homogeneous distribution over the entire length of the wall flow filter substrate.

In another embodiment, they may also be present in zoned form. This means that a wall flow filter substrate of length L which extends between an inlet end face and outlet end face bears a first catalytically active zone which extends for a length E proceeding from the inlet end face and a second catalytically active zone which differs from the first in terms of its composition and which extends for a length Z proceeding from the outlet end face, where E+Z≤L. The length of the zone at the inflow end is, for example, between 20% and 50% of the total length of the filter substrate.

The zeolite content in the two zones may be equal or similar. In general, the zone at the inflow end has a significantly higher noble metal loading, especially 60% to 90% of the total noble metal content of the filter coating.

If the filter has an $H_2S$ barrier function according to EP 2 275 194 A1, a zoned embodiment is advantageous. For this purpose, the copper compound is applied in a zone that takes up 20% to 80%, preferably 40% to 60%, of the substrate length and which can form the zone at the inlet end or outlet end. The remaining length of the filter substrate is then provided essentially with the above-described noble metal-containing coating.

The washcoat loading of the diesel particulate filter, in embodiments of the present invention, is 8 to 40 g/L.

In one embodiment of the present invention, the catalyst system for treatment of diesel exhaust gas comprises an SCR catalyst disposed downstream of the diesel particulate filter in flow direction of the exhaust gas.

Useful SCR catalysts include especially mixed oxide-based and zeolite-based SCR catalysts.

Suitable mixed oxides are, for example, vanadium-containing or vanadium-free mixed oxides, for example cerium- and lanthanoid-containing mixed oxides.

Zeolite-based SCR catalysts are especially copper- or iron-exchanged zeolites, for example of the CMA, SAPO, ZSM-5 and zeolite β types.

In an embodiment of the catalyst system of the invention which comprises an SCR catalyst, the particulate filter preferably contains a platinum-rich coating. This means that it contains either only platinum or platinum and palladium in a ratio of at least 4:1 in a loading of 20 to 50 g/cft.

The catalyst system of the invention preferably does not comprise any device for metered introduction of air into the exhaust gas stream.

In a further embodiment, the present invention relates to a catalyst system for treatment of diesel exhaust gas, which comprises, in flow direction of the exhaust gas,
- a nitrogen oxide storage catalyst containing a nitrogen oxide storage component, and noble metal in an amount of 150 to 180 g/ft$^3$ (5.30 to 6.36 g/L) and
- a diesel particulate filter containing platinum and palladium in a Pt:Pd weight ratio of 1:1 and in an amount of 10 to 25 g/ft$^3$ (0.35 to 0.88 g/L) and a zeolite compound in an amount of 10 to 25 g/L.

The catalyst system of the invention is outstandingly suitable for treatment of diesel exhaust gases and is capable of fulfilling the stipulations of the Euro 6 legislation in terms of the treatment of NOx, HC, CO and particulates.

The present invention thus also relates to a method of treating diesel exhaust gases, which is characterized in that the diesel exhaust gas is passed over a catalyst system comprising, in flow direction of the exhaust gas,
- a nitrogen oxide storage catalyst containing a nitrogen oxide storage component and noble metal and
- a diesel particulate filter containing noble metal selected from the group of platinum, palladium, and platinum and palladium, wherein the noble metal loading of the nitrogen oxide storage catalyst is 100 to 180 g/ft$^3$ (3.53 to 6.36 g/L) and the noble metal loading of the diesel particulate filter is 5 to 35 g/ft$^3$ (0.18 to 1.24 g/L).

In the method of the invention, the nitrogen oxide storage catalyst assumes the function of NOx and CO conversion in the lean/rich exhaust gas, while the diesel particulate filter is responsible exclusively for conversion of HC and residual traces of CO, and for particulate filtration and regeneration. This is achieved especially by distribution of the noble metal present in the catalyst system in an optimal manner between nitrogen oxide storage catalyst and diesel particulate filter.

Configurations of the method of the invention correspond to the above-described configurations of the catalyst system of the invention.

COMPARATIVE EXAMPLE a) For production of a nitrogen oxide storage catalyst, a commercial flow-through substrate was coated in a conventional manner with a catalyst formulation in a total amount of 347 g/L. The washcoat contained 100 g/ft$^3$ of platinum, 22 g/ft$^3$ of palladium and 5 g/ft$^3$ of rhodium, supported on a standard lanthanum-stabilized alumina, and also 17 g/L of BaO and 220 g/L of cerium oxide. The total noble metal loading of the nitrogen oxide storage catalyst is 127 g/ft$^3$.

b) For production of a diesel particulate filter, a commercial wall flow filter substrate was coated in the following manner:

Intake zone: 100 g/ft$^3$ of platinum and palladium in a weight ratio of 2:1 on a lanthanum-stabilized alumina and 9 g/L of a commercially available beta-zeolite for one third of the length of the filter substrate. Outflow zone: 10 g/cft of platinum and palladium in a weight ratio of 2:1 on a lanthanum-stabilized alumina and 10 g/L of a commercially available beta-zeolite for the remaining two thirds of the length of the filter substrate.

This results in a total loading of 40 g/cft of platinum and palladium in a weight ratio of 2:1.

c) The nitrogen oxide storage catalyst according to a) and the diesel particulate filter according to b) were combined to give a catalyst system (with the diesel particulate filter at the outflow end).

Example 1 a) For production of a nitrogen oxide storage catalyst, the procedure was analogous to a) in the comparative example, except that the platinum loading was increased to 126 g/ft$^3$ and the palladium loading to 37.8 g/ft$^3$, while the rhodium loading was kept constant at 5 g/ft$^3$. This results in a total loading of 168.8 g/ft$^3$ of noble metal.

b) For production of a diesel particulate filter, a commercial wall flow filter substrate was coated as follows:

Intake zone: 55 g/ft$^3$ of platinum and palladium in a weight ratio of 1:1 on a lanthanum-stabilized alumina and 9 g/L of a commercially available beta-zeolite for one third of the length of the filter substrate. Outflow zone: 10 g/ft$^3$ of platinum and palladium in a weight ratio of 1:1 on a lanthanum-stabilized alumina and 10 g/L of a commercially available beta-zeolite for the remaining two thirds of the length of the filter substrate.

This results in a total loading of 25 g/cft of platinum and palladium in a weight ratio of 1:1.

c) The nitrogen oxide storage catalyst according to a) and the diesel particulate filter according to b) were combined to give a catalyst system (with the diesel particulate lifter at the outflow end).

Determination of System Performance

The system performance of the catalyst systems according to example 1 and the comparative example was measured on an engine testbed according to NEDC (New European Driving Cycle). For this purpose, the amounts of CO, HC and NO$_x$ emitted were determined in mg/km. The results can be found in table 1.

TABLE 1

| | Noble metal loading of the nitrogen oxide storage catalyst/of the DPF [g/ft$^3$] | Emission [mg/km] | | |
|---|---|---|---|---|
| | | CO | HC | NO$_x$ |
| Example | 168.8/25 | 89 | 57 | 72 |
| Comparative example | 127/40 | 135 | 59 | 82 |

This shows that the catalyst system according to example 1 is distinctly superior to that according to the comparative example both in terms of CO conversion and NOx conversion.

Example 2

The nitrogen oxide storage catalyst according to example 1 a) was combined with a diesel particulate filter according to example 1 c) to give a catalyst system which had been produced as follows:

A commercial wall flow filter substrate was coated as follows:

Homogeneous coating over the entire length L of the wall flow filter substrate: 10 g/ft$^3$ of platinum and palladium in a weight ratio of 1:1 on a lanthanum-stabilized alumina and 9 g/L of a commercially available beta-zeolite.

This results in a total loading of 10 g/ft$^3$ of platinum and palladium in a weight ratio of 1:1.

The catalyst system thus obtained features properties comparable to those of the catalyst system of example 1.

Example 3

The nitrogen oxide storage catalyst according to example 1 a) was combined with a diesel particulate filter according to example 1 c) to give a catalyst system which had been produced as follows:

A commercial wall flow filter substrate was coated as follows:

Intake zone: 40 g/ft$^3$ of platinum and palladium in a weight ratio of 2:1 on a lanthanum-stabilized alumina and 9 g/L of a commercially available beta-zeolite for one third of the length of the filter substrate. Outflow zone: 10 g/ft$^3$ of platinum and palladium in a weight ratio of 2:1 on a lanthanum-stabilized alumina and 10 g/L of a commercially available beta-zeolite for the remaining two thirds of the length of the filter substrate.

This results in a total loading of 20 g/ft$^3$ of platinum and palladium in a weight ratio of 2:1.

The catalyst system thus obtained features properties comparable to those of the catalyst system of example 1.

Example 4 a) The nitrogen oxide storage catalyst according to example 1 a) was combined with a diesel particulate filter and an SCR catalyst to give a catalyst system, with the following sequence in flow direction of the exhaust gas: nitrogen oxide storage catalyst, diesel particulate filter, SCR catalyst.

b) For production of the diesel particulate filter, a commercial wall flow filter substrate was coated as follows:

Homogeneous coating over the entire length L of the wall flow filter substrate: 50 g/ft$^3$ of platinum and palladium in a weight ratio of 6:1 on a lanthanum-stabilized alumina and 33 g/L of a commercially available beta-zeolite.

This results in a total loading of 50 g/ft$^3$ of platinum and palladium in a weight ratio of 6:1.

c) For production of the SCR catalyst, a commercial flow substrate was coated in a conventional manner with a copper-containing zeolite washcoat in a total amount of 200 g/L.

The invention claimed is:

1. A catalyst system for treatment of diesel exhaust gas, comprising, in flow direction of the exhaust gas,
    a nitrogen oxide storage catalyst containing a nitrogen oxide storage component and noble metal and
    a diesel particulate filter containing noble metal selected from the group of platinum, palladium, and platinum and palladium,
wherein the noble metal loading of the nitrogen oxide storage catalyst is 100 to 180 g/ft$^3$ (3.53 to 6.36 g/L) and the noble metal loading of the diesel particulate filter is 5 to 35 g/ft$^3$ (0.18 to 1.24 g/L).

2. The catalyst system as claimed in claim 1, wherein the nitrogen oxide storage component is selected from a group consisting of oxides, hydroxides, oxide hydroxides, carbonates and hydrogencarbonates of the alkali metals, the alkaline earth metals, lanthanum and the lanthanoids (Ce to Lu).

3. The catalyst system as claimed in claim 1, wherein the nitrogen oxide storage component is selected from a group consisting of oxides, hydroxides, oxide hydroxides, and carbonates of strontium and of barium.

4. The catalyst system as claimed in claim 1 wherein the noble metal loading of the nitrogen oxide storage catalyst is 150 to 180 g/ft$^3$ (5.30 to 6.36 g/L).

5. The catalyst system as claimed in claim 1, wherein the noble metal loading of the diesel particulate filter is 10 to 25 g/ft$^3$ (0.35 to 0.88 g/L).

6. The catalyst system as claimed in claim 1, wherein the diesel particulate filter contains a zeolite compound.

7. The catalyst system as claimed in claim 6, wherein the zeolite compound is selected from a group consisting of β-zeolite, zeolite Y, mordenite, and ZSM-5.

8. The catalyst system as claimed in claim 6, wherein the zeolite compound is contained in an amount of 5 to 25 g/L.

9. The catalyst system as claimed in claim 1, the diesel particulate filter has an H$_2$S barrier function.

10. The catalyst system as claimed in claim 1, wherein the catalyst system comprises an SCR catalyst disposed downstream of the diesel particulate filter in flow direction of the exhaust gas.

11. The catalyst system as claimed in claim 10, wherein the SCR catalyst comprises a mixed oxide selected from a group consisting of vanadium-containing and vanadium-free mixed oxides.

12. The catalyst system as claimed in claim 10, wherein the SCR catalyst is selected from a group consisting of copper and iron-exchanged zeolites of the CHA, SAPO, ZSM-5 or zeolite β types.

13. The catalyst system as claimed in claim 1, wherein,
    the nitrogen oxide storage catalyst comprises noble metal in an amount of 160 to 180 g/ft$^3$ (5.65 to 6.36 g/L) and
    the diesel particulate filter comprises platinum and palladium in a Pt:Pd weight ratio of 1:1 and in an amount of 10 to 25 g/ft$^3$ (0.35 to 0.88 g/L), and a zeolite compound in an amount of 10 to 25 g/L.

14. A method of treating diesel exhaust gases, wherein the diesel exhaust gas is passed over a catalyst system comprising, in flow direction of the exhaust gas,
    a nitrogen oxide storage catalyst containing a nitrogen oxide storage component and noble metal and a diesel particulate filter containing noble metal selected from the group of platinum, palladium, and platinum and palladium, wherein the noble metal loading of the nitrogen oxide storage catalyst is 100 to 180 g/ft$^3$ (3.53 to 6.36 g/L) and the noble metal loading of the diesel particulate filter is 5 to 35 g/ft$^3$ (0.18 to 1.24 g/L).

* * * * *